(12) United States Patent
Meli et al.

(10) Patent No.: US 11,203,363 B2
(45) Date of Patent: Dec. 21, 2021

(54) METHOD FOR BALANCING A COMPONENT OF POWER PROVIDED BY TWO POWERED INVERTERS, ASSOCIATED GRID AND RAILWAY VEHICLE

(71) Applicant: SpeedInnov, Paris (FR)

(72) Inventors: Takuefou Meli, Tarbes (FR); Didier Colin, Tarbes (FR)

(73) Assignee: SPEEDINNOV, Paris (FR)

( * ) Notice: Subject to any disclaimer, the term of this patent is extended or adjusted under 35 U.S.C. 154(b) by 111 days.

(21) Appl. No.: 16/689,173

(22) Filed: Nov. 20, 2019

(65) Prior Publication Data
US 2020/0156666 A1    May 21, 2020

(30) Foreign Application Priority Data
Nov. 21, 2018  (EP) ..................... 18306536

(51) Int. Cl.
*H02M 7/44* (2006.01)
*B61C 3/00* (2006.01)

(52) U.S. Cl.
CPC ................. *B61C 3/00* (2013.01); *H02M 7/44* (2013.01)

(58) Field of Classification Search
CPC ...................................................... H02M 7/44
See application file for complete search history.

(56) References Cited

U.S. PATENT DOCUMENTS

| 6,016,262 A * | 1/2000 | Karlsson | H02J 3/34 |
| | | | 363/67 |
| 2015/0333612 A1* | 11/2015 | Hasler | H02M 7/483 |
| | | | 363/39 |
| 2016/0144871 A1* | 5/2016 | Jalla | B60L 1/003 |
| | | | 105/27 |

FOREIGN PATENT DOCUMENTS

| EP | 3012941 A1 | 4/2016 |
| FR | 2917343 A1 | 12/2008 |

OTHER PUBLICATIONS

European Search Report, dated Apr. 8, 2019, from corresponding European application No. 18306536.
Liu et al.; Improved Droop Control of Direct Paralleled Inverters in Railway Converter Applications; The 9th International Conference on Modelling, Identification and Control (ICMIC); Jul. 10, 2017; pp. 494-499.

* cited by examiner

*Primary Examiner* — Daniel Kessie
(74) *Attorney, Agent, or Firm* — Nixon & Vanderhye

(57) ABSTRACT

Disclosed is a method for balancing at least one component of the power supplied by two inverters powered in parallel in a power grid of a railway vehicle, the method including:—a step for measuring the variation of a component of a current supplied by a first inverter, in order to obtain a measured variation; and—a step for modifying a control setpoint of the first inverter as a function of the measured variation.

14 Claims, 1 Drawing Sheet

METHOD FOR BALANCING A COMPONENT OF POWER PROVIDED BY TWO POWERED INVERTERS, ASSOCIATED GRID AND RAILWAY VEHICLE

The present invention claims the benefit of document EP 18306536.6 filed on Nov. 21, 2019 which is hereby incorporated by reference.

FIELD OF THE INVENTION

The present invention relates to a method for balancing at least one component of the power supplied by two converters, in particular two inverters connected in parallel in a power grid of a railway vehicle. The present invention also relates to a power grid of an associated railway vehicle as well as a railway vehicle including such a grid.

BACKGROUND OF THE INVENTION

In the case of railway applications, it is desirable to monitor the power supplied by each element of a grid, in particular when the fundamental frequency of the grid needs to be changed.

To that end, it is known to measure each operating value of each element, for example in current, voltage and frequency, and to monitor the value of each one independently.

It is in particular known to divide the power grid into several sub-grids, each sub-grid being powered by a single converter. However, this method does not make it possible to optimize the power balancing.

Another known solution is to have a single power grid powered by several converters. However, the current method in this case requires a fixed-frequency grid.

There is therefore a need for a method for balancing at least one component of the power supplied by two converters, in particular two inverters powering a power grid in parallel of a railway vehicle that is implemented easily.

SUMMARY OF THE INVENTION

To that end, proposed is a method for balancing at least one component of the power supplied by two electrical energy converters powered in parallel in a power grid of a vehicle, the method including a step for measuring the variation of a component of a current supplied by a first converter, in order to obtain a measured variation, and a step for modifying a control setpoint of the first converter as a function of the measured variation.

According to specific embodiments, the method has one or more of the following features, considered alone or according to any technically possible combinations:
the electrical energy converters are inverters.
the vehicle is a railway vehicle.
the at least one supplied power component is the active power or the reactive power.
in the measuring step, the component of the measured supplied current is the reactive current or the active current.
the control setpoint includes a frequency control setpoint.
the control setpoint of the frequency is an affine function of the measured variation.
the control setpoint includes a control setpoint of the voltage.
the control setpoint of the voltage is an affine function of the measured variation.

the affine function is a decreasing function of the measured variation.

In particular, proposed is a method for balancing at least one component of the power supplied by first and second electrical energy converters, in particular two inverters, connected in parallel in a power grid of a vehicle, in particular a railway vehicle, the power grid being able to operate at a fundamental frequency, the method including:
a step for controlling the change of the fundamental frequency of the power grid,
a step for varying the frequency setpoint of the second converter as a function of the change of the fundamental frequency,
a step for measuring the variation of a component of a current supplied by a first converter, in order to obtain a measured variation, and
a step for modifying a control setpoint of the first converter as a function of the measured variation.

Advantageously, during the frequency change control step, a controller receives a frequency, and in particular fundamental frequency, change control to a specified value, during the frequency setpoint variation step of the second converter, the controller causes a frequency control setpoint of the second inverter to change linearly from a current value to the specified value, during the measuring step, the variation of the frequency at the output of the first inverter is measured, and a measurement of the current at the moment where the frequency change phase is launched is done, and during the control setpoint modification step, the controller controls a current setpoint of the first inverter from the variation of the frequency measured at the output of the first inverter and the measurement of the current at the moment where the frequency change phase is launched.

Also proposed is a power grid of a railway vehicle including two energy converters powered in parallel, a sensor for measuring the variation of a component of the current supplied by a first inverter, in order to obtain a measured variation, and a controller suitable for balancing at least one component of the power supplied by the two converters, the controller further being suitable for modifying a control setpoint of the first converter as a function of the measured variation.

Also described is a railway vehicle powered by a catenary and including an auxiliary power grid, the power grid being a power grid as previously described.

BRIEF DESCRIPTION OF THE DRAWINGS

Features and advantages of the invention will appear more clearly upon reading the following description, provided solely as a non-limiting example, and done in reference to the appended drawings, in which.

DETAILED DESCRIPTION OF THE PREFERRED EMBODIMENTS

Figure 1:
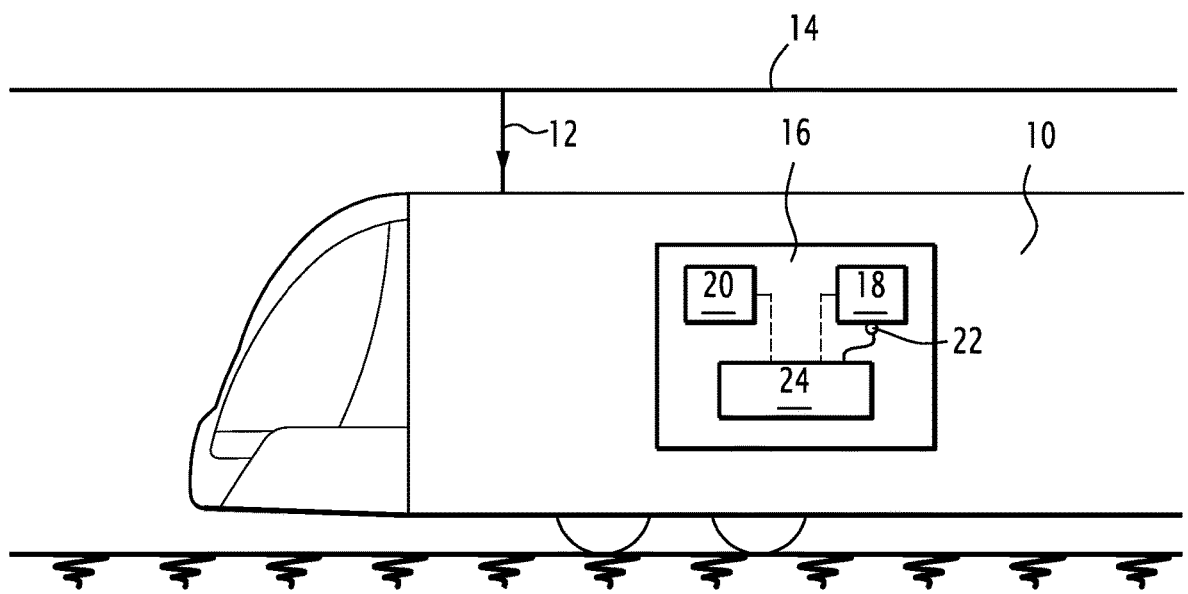
FIG. 1 is a schematic illustration of an exemplary railway vehicle powered by a catenary.

A railway vehicle 10 is schematically illustrated in FIG. 1.

The vehicle 10 is for example a subway equipped with backup ventilation, a train or a tram.

The vehicle 10 is supplied with electricity by a pantograph 12 that rubs a power catenary 14. The catenary 14 is supplied with high voltage, that is to say, typically a DC voltage with a nominal value greater than or equal to 600 Vdc. For example, in the illustrated example, the power voltage of the catenary 14 is equal to 1500 Vdc.

"Catenary 14" refers both to overhead wires suspended above railroad tracks and making it possible to power the vehicle 10 and a third rail on the ground extending along the railroad tracks and on which a shoe rubs, so as to supply the vehicle 10 with electrical energy.

The vehicle 10 includes an auxiliary power grid 16.

The auxiliary power grid 16 is a backup grid 16 in case of interruption of the power supply of the vehicle 10 by the catenary. Such an interruption of the power supply is of accidental or deliberate origin.

The auxiliary grid 16 is a three-phase grid 16.

More specifically, the auxiliary grid 16 comprises three phase conductors and a neutral conductor.

The auxiliary grid 16 extends in several cars of the vehicle 10. Only part of the auxiliary grid 16 is visible in FIG. 2.

The auxiliary power grid 16 includes a first inverter 18, a second inverter 20, a measuring sensor 22 and a controller 24.

The first inverter 18 is an electronic power device making it possible to generate AC voltages and currents from an electrical energy source with a different voltage or frequency.

The second inverter 20 performs the same function as the first inverter 18, namely converting an electrical energy source with a different voltage or frequency into an AC voltage or current.

The two inverters 18 and 20 are powered in parallel.

This means that each inverter 18 and 20 is connected to a same bus, not shown.

For example, the bus is able to transport a voltage of 400 Vdc.

Hereinafter, it is recalled that the active power PA of an inverter is defined by the following relationship:

$$PA = U \cdot I \cdot \cos(\varphi)$$

where:
I is the effective value of the three-phase current supplied by the inverter,
U is the effective value of the three-phase voltage supplied by the inverter, and
$\varphi$ is the value of the phase shift between the fundamental component of the current and the fundamental component of the three-phase voltage.

Similarly, the reactive power PR is defined by the following relationship:

$$PR = U \cdot I \cdot \sin(\varphi)$$

The active currents $I_{active}$ and $I_{reactive}$ are, respectively, equal to $I \cdot \cos(\varphi)$ and $I \cdot \sin(\varphi)$.

The measuring sensor 22 is a sensor capable of measuring the variation of the component of the current supplied by the first inverter 18, in order to obtain a measured variation.

The component of the measured supplied current is the reactive current or the active current.

According to the example of FIG. 1, the measuring sensor 22 is a current sensor measuring both the reactive current and the active current.

The controller 24 is for example a processor.

The controller 24 is suitable for balancing at least one component of the power supplied by the two inverters 18 and 20.

At least one supplied power component is the active power or the reactive power.

In the case at hand, the controller 24 is suitable for balancing both the active power and the reactive power supplied by the two inverters 18 and 20.

The controller 24 is further suitable for varying a control setpoint of the first inverter 18 as a function of the variation measured by the measuring sensor 22.

More specifically, the controller 24 is capable of imposing a frequency control setpoint and a voltage control setpoint for the first inverter 18.

Figure 2:
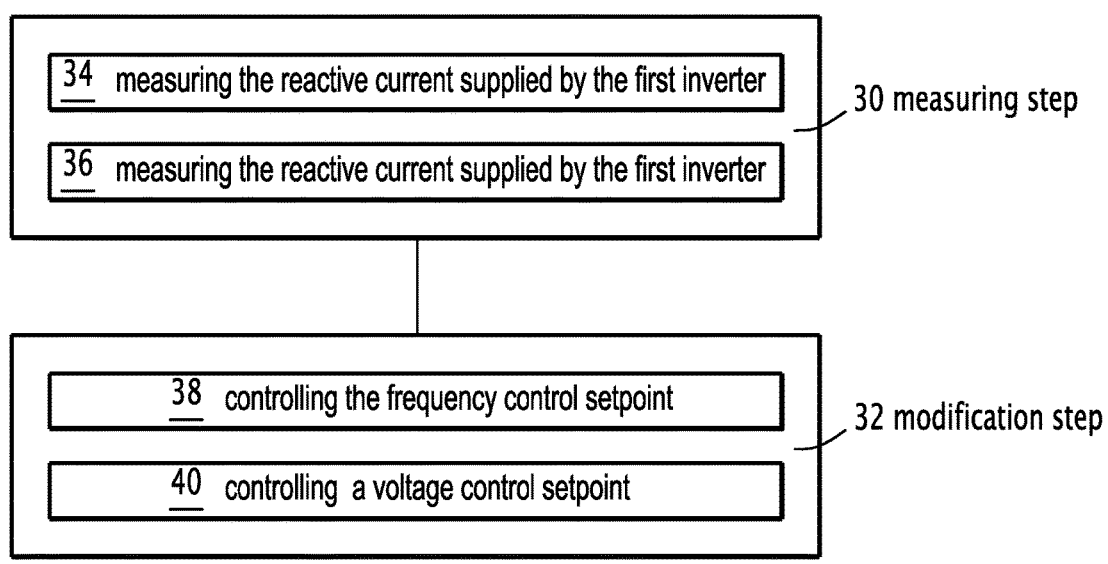
FIG. 2 is a flowchart of an exemplary embodiment of a balancing method according to the invention.

The operation of the auxiliary power grid 16 and more specifically the controller 24 is now described in reference to FIG. 2, which corresponds to a flowchart of an exemplary embodiment of a balancing method according to the invention.

The balancing method is a method for balancing two components of the power supplied by two inverters, namely the active power and the reactive power.

As shown in FIG. 2, the method includes a measuring step 30 and a modification step 32.

During the measuring step 30, the variation of a current component supplied by the first inverter 18 is measured.

In the illustrated case, the measuring sensor 22 measures the reactive current supplied by the first inverter 18 as indicated schematically by the box referenced 34 in FIG. 2. The measuring sensor 22 also measures the active current supplied by the first inverter 18, as indicated schematically by the box referenced 36 in FIG. 2.

A measured variation for the reactive current and a measured variation for the active current are thus obtained.

The measured variations are sent to the controller 24.

During the modification step 32, the controller 24 varies a control setpoint of the first inverter 18. The variation of the control setpoint is a function of the measured variation.

More specifically, for the illustrated case and as shown schematically by the boxes bearing reference numbers 38 and 40, the control setpoint includes a frequency control setpoint and a voltage control setpoint.

The frequency control setpoint is deduced from the variation measured for the active current. In other words, the frequency control setpoint is a function of the variation measured for the active current.

The function is an affine function of the measured variation.

In the proposed example, the affine function decreases with the measured variation.

Mathematically, this is written as follows:

$$f_{setpoint} = f_0 - a \cdot \Delta I_{active}$$

where:
$f_{setpoint}$ is the frequency setpoint value applied to the first inverter 18,
$f_0$ is the current value of the frequency of the first inverter 18,
a is a proportionality coefficient, for example equal to the ratio calculated between the maximum possible frequency variation for the first inverter 18 and the nominal active current, the maximum possible frequency variation for the first inverter 18 in some cases being able to be imposed by desired operating constraints for the grid 16, and
$\Delta I_{active}$ is the measured active current variation of the first inverter 18.

The voltage control setpoint is deduced from the measured variation for the reactive current. In other words, the voltage control setpoint is a function of the variation measured for the reactive current.

The function is an affine function of the measured variation.

In the proposed example, the affine function decreases with the measured variation. In other words, the function is a decreasing function of the measured variation, which is also affine.

Mathematically, this is written as follows:

$$V_{setpoint} = V_0 - b \cdot \Delta I_{reactive}$$

where:
- $V_{setpoint}$ is the voltage setpoint value applied to the first inverter 18,
- $V_0$ is the current value of the voltage of the first inverter 18,
- b is a proportionality coefficient, for example equal to the ratio calculated between the maximum possible voltage variation for the first inverter 18 and the nominal reactive current, the maximum possible voltage variation for the first inverter 18 in some cases being able to be imposed by desired operating constraints for the grid 16, and
- $\Delta I_{reactive}$ is the measured reactive current variation of the first inverter 18.

Advantageously, the controller 24 is able to impose a frequency control setpoint and a voltage control setpoint for the second inverter 20, as described for the first inverter 18, by using a sensor capable of measuring the variation of a component of the current supplied by the second inverter 20, similar to the sensor 22.

The method is thus based on a balancing principle of the energy consumption controlling the divergence of the current.

More specifically, to regulate the active current, for a fixed active power consumed by the grid 16, it is desirable for both inverters to supply the same active power and thus to be stable.

If the active power supplied by the first inverter 18 is greater than the active power supplied by the second inverter 20, the respective frequency setpoints of each of the two inverters should lead to a negative active current variation for the first inverter 18, and positive for the second inverter 20. In other words, the frequency setpoint of the first inverter 18 should undergo a negative variation and the frequency setpoint of the second inverter 20 should undergo a positive variation.

Similarly, if the active power supplied by the first inverter 18 is less than the active power supplied by the second inverter 20, the respective frequency setpoints of each of the two inverters should lead to a positive active current variation for the first inverter 18, and negative for the second inverter 20. In other words, the frequency setpoint of the first inverter 18 should undergo a positive variation and the frequency setpoint of the second inverter 20 should undergo a negative variation.

It results from this observation that the frequency control setpoint is a frequency setpoint that decreases when the supplied active power increases and that increases when the supplied active power decreases.

Furthermore, in order to regulate the reactive current, for a fixed reactive power consumed by the grid 16, it is desirable for both inverters to supply the same reactive power and thus to be stable.

If the reactive power supplied by the first inverter 18 is greater than the reactive power supplied by the second inverter 20, the respective voltage setpoints of each of the two inverters should lead to a negative active current variation for the first inverter 18, and positive for the second inverter 20. In other words, the voltage setpoint of the first inverter 18 should undergo a negative variation and the voltage setpoint of the second inverter 20 should undergo a positive variation.

Similarly, if the reactive power supplied by the first inverter 18 is less than the reactive power supplied by the second inverter 20, the respective voltage setpoints of each of the two inverters should lead to a positive reactive current variation for the first inverter 18, and negative for the second inverter 20. In other words, the voltage setpoint of the first inverter 18 should undergo a positive variation and the voltage setpoint of the second inverter 20 should undergo a negative variation.

It results from this observation that the voltage control setpoint is a voltage setpoint that decreases when the supplied reactive power increases and that increases when the supplied reactive power decreases.

In summary, the method allows the balancing of inverters that are powered in parallel.

In addition, this mechanism operates for any nominal fundamental frequency and any nominal voltage.

This method also make it possible to vary the fundamental frequency of the grid while keeping the inverters synchronized relative to one another, that is to say, without electrically disconnecting the inverters from one another. To achieve this, when a change in nominal frequency setpoint is detected by the algorithm, the inverter(s) assigned a slave role, such as the first inverter, begin regulating the active current and the reactive current that it or they supply on the grid by setting the voltage and the frequency that it or they impose on the grid (in order to respectively regulate the reactive current and the active current), and only the inverter assigned the master role, such as the second inverter, varies its nominal frequency and/or its nominal voltage.

The method is easy to carry out.

Indeed, no exchange of information between the two inverters is involved to carry out the method.

The method makes it possible to limit the losses of conduction in the cables of the grid 16.

Furthermore, the method allows optimal sizing of each element of the grid 16, in particular of the inverters and cables.

Furthermore, since the inverters usually share power with the inverters for traction of the vehicle 10, the method makes it possible to ensure that the traction inverters are not underpowered, such that each traction motor is powered properly.

Such a method can be generalized for a grid 16 including a plurality of inverters, each inverter being powered in parallel.

Advantageously, the second inverter 20 is a master inverter and the controller 24 is configured to receive a frequency, and in particular fundamental frequency, change command on the auxiliary grid 16 to a specified value and to change a frequency control setpoint of the second inverter 20 linearly from a current value to the specified value.

The controller 24 is then able to control a current setpoint of the first inverter 18, called slave inverter, from the evolution of the frequency measured at the output of the first inverter 18 and a measurement of the current at the moment where the frequency change phase is launched. More specifically, the controller 24 is able to store/recover the active and reactive current values measured by the sensor 22 at the moment where the frequency change command was sent to the second inverter 20 and to calculate the current setpoint by applying a progression ramp to these currents as a function of the measured frequency.

When the grid frequency reaches the specified value, the controller 24 detects the end of the frequency change mode.

Such an operation makes it possible to vary the fundamental frequency of the grid while maintaining a synchronization of the two inverters 18, 20.

Advantageously, the grid 16 is devoid of communication/data exchange means between the first inverter 18 and the second inverter 20. More generally, the first inverter 18 is able to be controlled independently of electrical values relative to the second inverter 20 and vice versa.

It should also be noted that the method can be implemented for two electrical energy converters, the inverters being only one specific example.

Likewise, the method can apply to any type of vehicle, and in particular a railway vehicle.

The invention claimed is:

1. A method for balancing at least one component of power supplied by two electrical energy converters connected in parallel in a power grid of a vehicle, the power grid being configured to operate at a fundamental frequency, the method comprising:
controlling a change of the fundamental frequency of the power grid;
varying a frequency setpoint of a second converter of the electrical energy converters as a function of the change of the fundamental frequency;
measuring a variation of the at least one supplied power component of a current supplied by a first converter of the electrical energy converters, in order to obtain a measured variation;
measuring the current at a moment at which the change of the fundamental frequency occurs; and
modifying a control setpoint of the first converter of the electrical energy converters as a function of the measured variation and the measured current at the moment at which the change of the fundamental frequency occurs;
wherein the power grid comprises a controller,
during the controlling the change of the fundamental frequency, the controller receives a fundamental frequency change command to change the fundamental frequency to a specified value,
during the varying the frequency setpoint of the second converter, the controller causes the frequency setpoint to change linearly from a current value to the specified value,
during the measuring the variation of the at least one supplied power component, a variation of frequency at an output of the first converter is measured, and during the modifying the control setpoint, the controller controls the control setpoint as a function of the measured variation of frequency at the output of the first converter and the measured current at the moment at which the change of the fundamental frequency occurs.

2. The method according to claim 1, wherein each of the two electrical energy converters is an inverter.

3. The method according to claim 1, wherein the at least one supplied power component is the active power or the reactive power.

4. The method according to claim 1, wherein the at least one supplied power component is the reactive current or the active current.

5. The method according to claim 1, wherein the control setpoint includes a frequency control setpoint.

6. The method according to claim 5, wherein the control setpoint of the frequency is an affine function of the measured variation.

7. The method according to claim 6, wherein the affine function is a decreasing function of the measured variation.

8. The method according to claim 1, wherein the control setpoint includes a control setpoint of the voltage.

9. The method according to claim 8, wherein the control setpoint of the voltage is an affine function of the measured variation.

10. The method according to claim 9, wherein the affine function is a decreasing function of the measured variation.

11. A power grid of a vehicle, the power grid comprising:
two electrical energy converters powered in parallel;
a controller configured to
control a change of the fundamental frequency of the power grid, and
vary a frequency setpoint of a second converter of the electrical energy converters as a function of the change of the fundamental frequency; and
a sensor configured to
measure a variation of a component of a current supplied by a first converter of the two electrical energy converters, to obtain a measured variation, and
measure the current at a moment at which the change of the fundamental frequency occurs,
wherein the controller is further configured to
balance at least one component of the power supplied by the two electrical energy converters,
modify a control setpoint of the first converter of the electrical energy converters as a function of the measured variation and the measured current at the moment at which the change of the fundamental frequency occurs.

12. The power grid according to claim 11, wherein the power grid is a power grid of a railway vehicle.

13. The power grid according to claim 11, wherein each converter is an inverter.

14. A railway vehicle powered by a catenary, the railway vehicle comprising:
an auxiliary power grid that is the power grid according to claim 11.

* * * * *